United States Patent
Subramanian et al.

(10) Patent No.: US 7,779,036 B2
(45) Date of Patent: *Aug. 17, 2010

(54) INTEGRATION FUNCTIONALITY FOR A TEST TOOL FOR APPLICATION PROGRAMMING INTERFACES

(75) Inventors: Sowmya Subramanian, Mountain View, CA (US); Larry Dean Harris, Belmont, CA (US); Sandeep Khemani, Fremont, CA (US); Thomas W. Nickerson, Independence, CA (US); George A. Buzsaki, Fremont, CA (US); Michael De Groot, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 325 days.

This patent is subject to a terminal disclaimer.

(21) Appl. No.: 10/991,608

(22) Filed: Nov. 17, 2004

(65) Prior Publication Data

US 2005/0187930 A1 Aug. 25, 2005

Related U.S. Application Data

(60) Provisional application No. 60/546,451, filed on Feb. 19, 2004.

(51) Int. Cl.
*G06F 17/30* (2006.01)
(52) U.S. Cl. .................. 707/791; 707/796
(58) Field of Classification Search .......... 707/100, 707/10
See application file for complete search history.

(56) References Cited

U.S. PATENT DOCUMENTS

| | | | | |
|---|---|---|---|---|
| 5,905,987 | A * | 5/1999 | Shutt et al. | 1/1 |
| 6,216,173 | B1 * | 4/2001 | Jones et al. | 715/705 |
| 6,272,341 | B1 * | 8/2001 | Threadgill et al. | 455/428 |
| 6,304,893 | B1 * | 10/2001 | Gish | 709/203 |
| 6,405,209 | B2 * | 6/2002 | Obendorf | 1/1 |
| 6,487,556 | B1 * | 11/2002 | Downs et al. | 1/1 |
| 6,507,845 | B1 * | 1/2003 | Cohen et al. | 1/1 |
| 6,523,027 | B1 * | 2/2003 | Underwood | 707/4 |
| 6,526,413 | B2 * | 2/2003 | Schwitters et al. | 1/1 |
| 6,529,909 | B1 * | 3/2003 | Bowman-Amuah | 707/10 |
| 6,532,465 | B2 * | 3/2003 | Hartley et al. | 707/10 |
| 6,609,128 | B1 * | 8/2003 | Underwood | 707/10 |
| 6,636,721 | B2 * | 10/2003 | Threadgill et al. | 455/12.1 |
| 2003/0005280 | A1 * | 1/2003 | Bobde et al. | 713/150 |
| 2003/0018932 | A1 * | 1/2003 | Blum et al. | 714/46 |
| 2003/0200048 | A1 * | 10/2003 | Schnarch | 702/119 |
| 2005/0015666 | A1 * | 1/2005 | Kamani et al. | 714/25 |

* cited by examiner

*Primary Examiner*—Don Wong
*Assistant Examiner*—Kim T Nguyen
(74) *Attorney, Agent, or Firm*—Aka Chan LLP

(57) ABSTRACT

Methods and apparatus for enabling efficient testing of application programming interface (API) frameworks and application code are disclosed. According to one aspect of the present invention, a method for capturing a call to an API using a framework including an execution engine that communicates with an adapter to cause the API call to be executed involves making the API call and constructing an object using metadata associated with the API call. The constructed object is converted into a node that is of a declarative metadata format, and the node is stored.

35 Claims, 9 Drawing Sheets

```
    <APITestType language="JAVA" id="createAccount" methodName="open"
604       class="com.usbc.banking.retail.CheckingAccount">
           636
    <Description>This API creates new checking account for a new or an
        existing customer for the bank. Internally, this API updates the core
        customer tables with mandatory information required for creating a
        new account </Description>
                                  616
    <ErrorInfo type="NORMAL ERROR">
        <message>Some mandatory customer information was invalid or
620      missing.</message>
        <fixInfo>Before calling this API, ensure that mandatory customer
620      information is valid. Refer to report for details.</fixInfo>
    </ErrorInfo>
              608
    <InputParams>                          628a
        <InputParam sequence="1" name="firstName" type="java.lang.String"
            value="John" />             628b
        <InputParam sequence="2" name="lastName" type="java.lang.String"
            value="Doe" />              628c
        <InputParam sequence="3" name="dob" type="java.sql.Date"
            value="1973-21-06" />
        <InputParam sequence="4" name="address" type="java.lang.String"
            value="600 Oracle Parkway. Redwood City, CA 94065" />
        <InputParam sequence="5" name="phone" type="java.lang.String"
            value="650-650-6500" />
        <InputParam sequence="6" name="initialDeposit_USD" type="java.lang.Integer"
            value="10000" />
        <InputParam sequence="7" name="socialSecNumber" type="java.lang.String"
            value="9999-99-9999" />
    </InputParams>
              612
    <OutputParams>
        <OutputParam name="accountNumber" type="int"
            target="${data.newAccountNum}" operation="NONE" />
    </OutputParams>             632

</APITestType>
```

```
800 — -<TestApp AppShortName="USBC" AppFullName="United States Banking Corp." file-
       version="$Header: USBC_Diagnostics.xml 115.6 2003/1/1/10 08:30:28 skhemani noship
       $">      802
       -<TestSuite ComponentIdentifier="Account Functionality" EnvDetail=""
          SecurityLevel="LOW">
806a —  +<APITestType language="JAVA" id="createAccount" methodName="open"
          class="com.usbc.banking.retail.CheckingAccount"/>
806b —  +<APITestType language....
          .
          .
806c —  -<APITestType language="JAVA" id="AccountBalanceAfterDeposit" methodName="getBalance"
          class="com.usbc.banking.retail.CheckingAccount">
          <Description>Given an account number, this API will return the new balance after
830 —     making a deposit into the account.</Description>
          -<ErrorInfo type="NORMAL ERROR">
834 —     <message>Please check the account number.</message>
          <fixInfo>The account number must be valid.</fixInfo>
          </ErrorInfo>
814 —   -<InputParams>     818
          <InputParam sequence="1" name="account" type="int"
          source="${data.newAccountNum}" />
          </InputParams>
822 —   -<OutputParams>    826
          <OutputParam name="balance" type="int" value="20000" operation="" />
          </OutputParams>
          </APITestType>
806d —  +<APITestType language....
          .
          .
        </TestSuite>
        </TestApp>
```

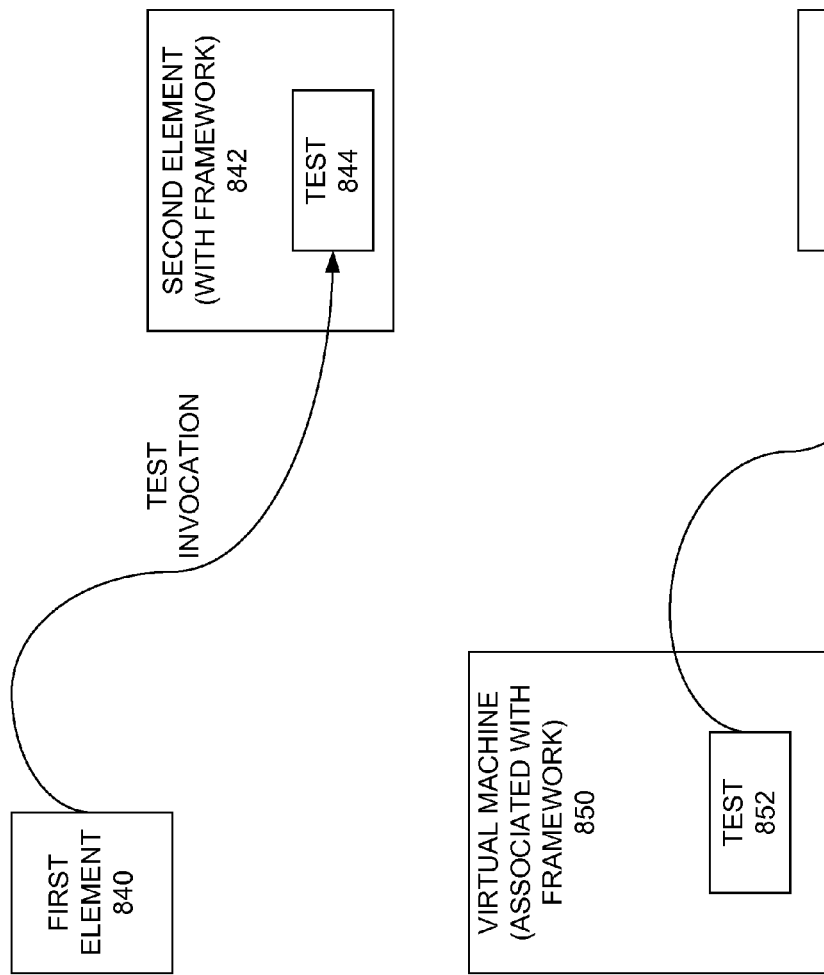

INTEGRATION FUNCTIONALITY FOR A TEST TOOL FOR APPLICATION PROGRAMMING INTERFACES

CROSS REFERENCE TO RELATED PATENT APPLICATION

This patent application claims priority of U.S. provisional patent application 60/546,451, entitled "API Test Tool," filed Feb. 19, 2004, which is incorporated herein by reference in its entirety. This patent application is related to copending U.S. patent application Ser. Nos. 10/991,883 and 10/991,607, filed concurrently herewith, which are each incorporated herein by reference in their entireties.

BACKGROUND OF THE INVENTION

1. Field of Invention

The present invention relates to database systems. More specifically, the invention relates to an application programming interface (API) testing system which enables API frameworks and application code to be efficiently tested.

2. Description of the Related Art

An application programming interface (API) is the interface used, or the calling conventions used, to allow an application program to access an operating system, as well as other system resources. APIs are often defined at a source code level, and effectively enable a level of abstraction to be present between an application program and a kernel. In some instances, an API may provide an interface between a high level language and lower level services, particularly those services or utilities which may have been written without taking into account calling conventions of compiled languages.

Testing of framework and application code associated with APIs is important to ensure that APIs function as intended. Without thorough testing of the framework and the application code associated with APIs, any errors or other unexpected results which may occur when an API is put into use may not be found until the API is used. When an API that is in use fails to function as intended, an application program which uses the API may be prevented from operating as desired.

Typically, for each test case associated with an API, a specific API test is coded and developed. The requirements for valid API tests on a framework and application code may be prohibitive in that a generally high number of tests are typically needed, and many issues may arise relating to the management of the tests. Hence, the requirements for comprehensive API tests on a framework and application code are often considered to be too extensive for comprehensive tests to be productive. As a result, API tests are likely to only be written to test code or test cases which are considered to be critical. In other words, not all test cases may be thoroughly tested.

When only some test cases associated with an API are subjected to API testing, the reliability of the API may be compromised, as the framework and application code associated with the API is not fully tested. Since the overhead and the overall costs associated with comprehensively testing the framework and application code associated with the API are generally prohibitive, many developers and users are electing to write API tests for only the most crucial test code or test cases.

Therefore, what is needed is a method and an apparatus which enables the framework and application code associated with an API to be efficiently tested. That is, what is desired is an API test tool that provides a framework which allows API tests to be readily developed.

SUMMARY OF THE INVENTION

The present invention relates to the efficient testing of application programming interface (API) frameworks and application code. According to one aspect of the present invention, a method for capturing a call to an API using a framework including an execution engine that communicates with an adapter to cause the API call to be executed involves making the API call and constructing an object using metadata associated with the API call. The constructed object is converted into a node that is of a declarative metadata format, and the node is stored. In one embodiment, converting the object into the node includes passing the object to the execution engine which accesses the adapter to convert the object into the node.

By enabling an API call to effectively be recorded and stored allows the API call to effectively be subsequently duplicated by accessing the stored API call. Hence, the efficiency with which calls and tests may be executed is enhanced, as a user may execute the call once and have it captured for later use, rather than having to execute the call each time the call is to be made or to create a test script for the call.

According to another aspect of the present invention, a system for capturing a call to an API includes a recording tool, which constructs an object with metadata that is associated with the API call. The system also includes an execution engine to which the recording tool is arranged to pass the object, and an adapter with which the execution engine communicates to cause the adapter to convert the object into a node that is in a declarative metadata format. A repository of the system is arranged to store the node. In one embodiment, the adapter is further arranged to cause the API call to execute. In another embodiment, the declarative metadata format is an XML format and the node is an XML node.

In accordance with still another aspect of the present invention, a framework includes a metadata provider arrangement that stores declarative metadata, a metadata provider interface that obtains the declarative metadata associated with a test from the declarative metadata provider, and a first test adapter. The first test adapter includes logic used to process the declarative metadata, and accesses remote information. The framework also includes a test interface that cooperates with the first test adapter to create a Java test, an execution engine that communicates with the test interface to cause the test to be executed.

According to yet another aspect of the present invention, a method for running an API test includes obtaining test data and providing the test data to a test interface. The test data includes declarative metadata and is obtained using a test declarative metadata adapter of a first class. The method also includes executing a test associated with the test data using the test interface. Executing the test associated with the test data using the test interface includes calling a first test adapter of the first class to obtain testing logic for executing the test associated with the test data. The first test adapter is in communication with the test interface, and includes a generic test adapter portion that defines at least one tag that is common to a plurality of test adapters of the first class and a test adapter portion that defines at least one tag that is not common to the plurality of test adapters of the first class. The first test adapter is also arranged to access one of an application and a database.

In one embodiment, the application is an application that is arranged to execute on a virtual machine that is common to the first test adapter and the application. In another embodiment, the application is an application that is arranged to execute on a different virtual machine than a virtual machine that is associated with the first test adapter.

Other features and advantages of the invention will become readily apparent upon review of the following description in association with the accompanying drawings, where the same or similar structures are designated with the same reference numerals.

BRIEF DESCRIPTION OF THE DRAWINGS

The invention may best be understood by reference to the following description taken in conjunction with the accompanying drawings in which:

FIG. 2 is a representation of an XML schema definition of an API test in accordance with an embodiment of the present invention.

FIG. 4 is a representation of one test application associated with an XML tag structure, e.g., the XML tag structure of FIG. 3, in accordance with an embodiment of the present invention.

FIG. 5a is a diagrammatic representation of a remote test invocation in accordance with an embodiment of the present invention.

FIG. 5b is a diagrammatic representation of a test which accesses a remote application or a remote database in accordance with an embodiment of the present invention.

DETAILED DESCRIPTION OF THE EMBODIMENTS

In the description that follows, the present invention will be described in reference to embodiments that test subsystems on a platform for a software application, such as a database application. However, embodiments of the invention are not limited to any particular architecture, environment, application, or implementation. For example, although embodiments will be described in reference to database applications, the invention may be advantageously applied to any software application. Therefore, the description of the embodiments that follows is for purposes of illustration and not limitation.

A framework which enables application programming interface (API) testing to occur without requiring that a specific API test be written for each test case enables testing of an API framework and API application code to occur efficiently. Such a framework may allow for relatively efficient development of API tests by effectively allowing functionality associated with different API tests to be shared and reused. When such a framework not only allows an API to be tested without requiring that significant amount of software be written, and further enables multiple API tests to be chained together, an API may be comprehensively tested in an efficient manner. Hence, the reliability of an API may be enhanced as developers may be more willing, as well as able, to more fully test an API since the need to write a significant amount of software code is effectively eliminated.

Figure 1:
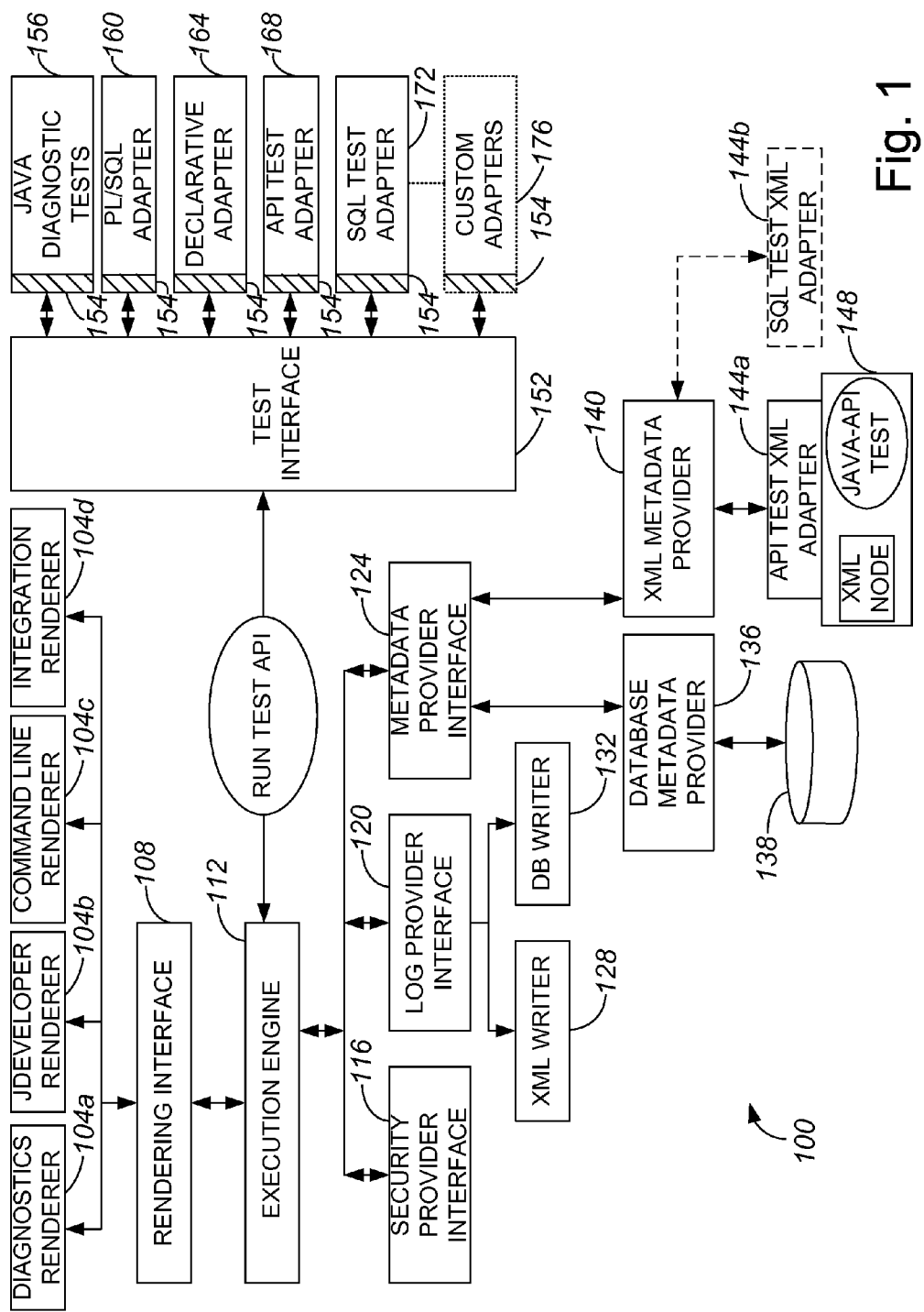
FIG. 1 is a block diagram representation of an architecture which includes a diagnostics and application programming interface (API) testing framework in accordance with an embodiment of the present invention.

FIG. 1 is a diagrammatic representation of an implementation architecture of a diagnostics and API testing framework in accordance with an embodiment of the present invention. An architecture 100, which may be part of a computing system which includes processors and storage devices on which code devices associated with the architecture are stored, is arranged to provide a diagnostics and testing framework, e.g., an API testing framework. Within architecture 100, repositories 138, 148 are arranged to store data, e.g., repository 148 is arranged to store information pertaining to an API test. Repository 138, which may be a database that stores tables, is arranged to be accessed by a database metadata provider. Similarly, repository 148, which is arranged to store XML files is arranged to be accessed by an XML metadata provider 140 through an API test XML adapter 144a. It should be appreciated that although XML files are discussed, the files stored for use in the implementation architecture may generally be substantially any files written using declarative metadata.

Database metadata provider 136 and XML metadata provider 140 are source specific providers that are arranged to transform data into a format that may be understood by an execution engine or layer 112. While only database metadata provider 136 and XML metadata provider 140 are shown, any number of providers may generally be included that interface with execution engine 112 via a metadata provider interface 124. Metadata provider interface 124 is generally arranged such that providers such as database metadata provider 136 and XML metadata provider 140 may communicate with execution engine 112.

API test XML adapter 144a is arranged to enable custom tags of an XML schema definition, which will be described below with reference to FIGS. 5 and 6, to be read and written. In general, API test XML adapter 144a is an interface that is arranged to persist XML data. API test XML adapter 144a may marshal XML test data into a custom test object, e.g., a custom Java test object, at run-time that may effectively be executed by execution engine 112. It should be understood that other types of test XML adapters, as for example a SQL test XML adapter 144b, may be provided to interface with XML metadata provider 140 to enable custom tags of an XML schema definition associated with a SQL test to be read and written. XML metadata provider 140 is generally arranged to identify an appropriate test XML adapter or test type adapter for a test to be executed.

When execution engine 112 runs tests such as an API test, execution engine 112 accesses a security provider interface 116 which provides a security model that is used to enforce authorization rules which control access to a test and to test results. That is, security provider interface 116 is arranged to enforce security in terms of who may run a test and who may view the output of a test. In one embodiment, security provider interface 116 delegates a call to a security provider (not shown).

Execution engine 112 also logs information, e.g., the output of tests, for reporting purposes using a log provider interface 120. Log provider interface 120 is effectively a reporting storage interface. Repositories such as an XML writer 128 and a database writer 132 which are interfaced with execution engine 112 through log provider interface 120 are arranged to store reports which are persisted in log files. XML writer 128 may be used for the storage of reports associated with XML metadata, while database writer 132 may be used for the storage of reports associated with database metadata.

In general, execution engine 112 includes the core execution logic associated with architecture 100, and delegates calls or logic to appropriate sources. Execution engine 112 may take user commands and cause a test to be run and registered, and also cause test results or output to be displayed as appropriate. For example, when an API test is to be run, execution engine 112 calls into a test interface 152 which effectively provides handshaking between execution engine 112 and adapters such as API test adapter 168, SQL test adapter 172, and any custom adapters 176.

For each test type, an adapter which is arranged to run the test type is effectively interfaced with test interface 152. By way of example, API test adapter 168 is arranged to include the logic that is needed in order to understand a test definition provided in an XML file. API test adapter 168 is arranged to instantiate the method identified in the XML file, and to provide the results of the instantiation to execution engine 112. In general, adapters such as API test adapter 168 transform declarative metadata into objects that implement test interface 152. At runtime, when execution engine 112 runs a test, an object that implements test interface 152 invokes desired APIs on a desired entity with prescribed input parameters, and also captures output parameters and performs comparisons to determine the success or the failure of the test.

In general, an adapter such as API test adapter 168 is a program which has the ability to transform data, e.g., declarative metadata, from one format into another such that the data may be understood by execution engine 112. API test adapter 168, for example, transforms test metadata into a format that is understood by execution engine 112.

Java diagnostic tests 156 which contain runtime information, a PL/SQL adapter 160, a declarative adapter 164, API test adapter 168, SQL test adapter 172, and any custom adapters 176 are all arranged to interface with execution engine 112 via test interface 152. Such elements effectively rewrite data into a language or format that is understood by test interface 152. Each of the elements which are effectively plugged into test interface 152 includes a generic adapter portion or a common layer 154. Specifically, each element plugged into test interface 152 essentially extends the functionality or logic associated with generic adapter portion 154. In one embodiment, while generic adapter portion 154 effectively handles common tags associated with a declarative metadata file, the extensions associated with each element, e.g., the extensions off of generic adapter portion 154 associated with API test adapter 168, handle custom or unique tags within the declarative metadata file. It should be appreciated that API test adapter 168 may include the capabilities associated with API test XML adapter 144a. That is, API test adapter 168 may be arranged to persist XML data and to read and write custom tags, in addition to being arranged to provide a running test logic interface.

Extensibility enables custom adapters 176 to be written as needed, and then plugged into test interface 152 when additional functionality within architecture 100 is desired. Extensibility further enables such custom adapters 176 to utilize and build off of generic adapter portion 154.

A rendering interface 108, which may include the ability to serve as a user interface rendering interface, is in communication with execution engine 112, and enables information pertaining to tests to be displayed to a user. Rendering interface 108 may be JSP fronted for web-based user interfaces, and generally provides an abstraction away from what a user interface is expected to look like. There may be several different user interfaces that may be used to present diagnostics data to a user. In general, diagnostics user interfaces and command line or text user interfaces may be in communication with rendering interface 108 through renderers 104. For each available interface, an associated interface renderer 104 that implements methods or routines prescribed by rendering interface 108 typically exists. That is, renderers 104 implement rendering interface 108. Such renderers 104 may include, but are not limited to, a diagnostics renderer 104a, a JDeveloper renderer 104b, a command line renderer 104c, and an integration renderer 104d, which may effectively be used to record a test. JDeveloper renderer 104b may be arranged to support a JDeveloper tool which is available commercially from Oracle, Incorporated of Redwood Shores, Calif. Integration renderer 104d may generally support a variety of interface tools. Suitable tools which may be supported by integration renderer 104d include, but are not limited to, diagnostic tools such as Winrunner which is available commercially from Mercury Interactive of Mountain View, Calif. In order for communication to be achieved with an interface layer (not shown), execution engine 112 invokes the methods of a suitable renderer 104 that is associated with a specified interface.

FIG. 2 is a representation of an XML schema definition or test script of an API test in accordance with an embodiment of the present invention. An XML schema definition 600 includes an API test type tag 604 that specifies an API to test. While the API to test may be substantially any suitable API, the API is shown as being an account creation API. Input parameters tag 608 which is specified in XML schema definition 600 is arranged to include, but is not limited to including, a first name of a potential account holder 628a, a last name of the potential account holder 628b, and a date of birth of the potential account holder 628c. Output parameters tag 612 generally includes an account number for a newly created account. A new account number 632 may be stored such that XML schemas for other API tests may access new account number 632, i.e., new account number 632 may be pipelined. The pipelining of data will be discussed below with reference to FIGS. 9a and 9b. An error condition tag 616 is specified for a normal error, and includes error message and fix information 620. In the embodiment as shown, XML schema definition 600 also includes a description tag 636 which is used to indicate what the API specified in entity to test 604 is arranged to do.

Figure 3:
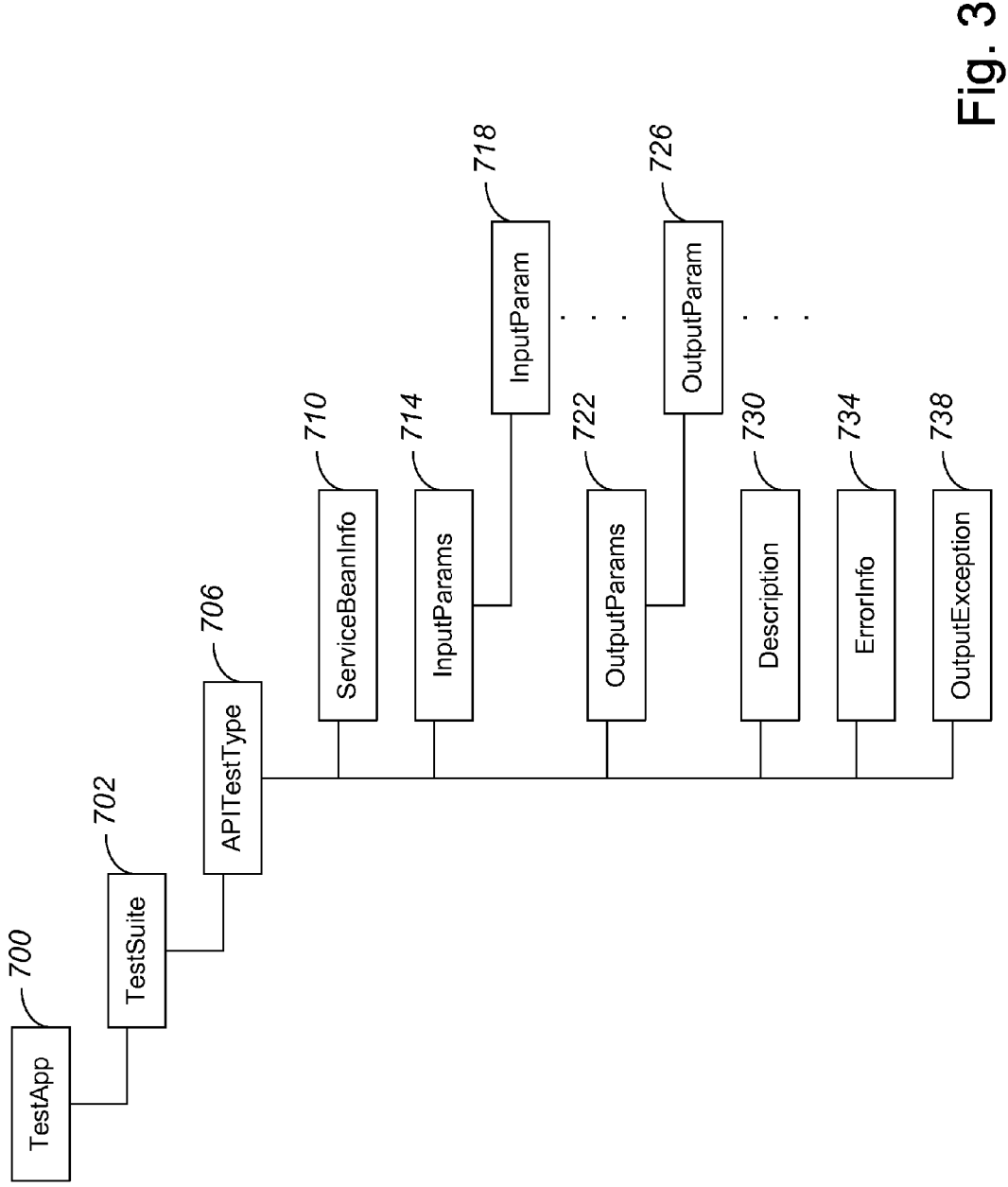
FIG. 3 is a diagrammatic representation of a first XML tag structure which is used within an overall test application in accordance with an embodiment of the present invention.
Figure 6:
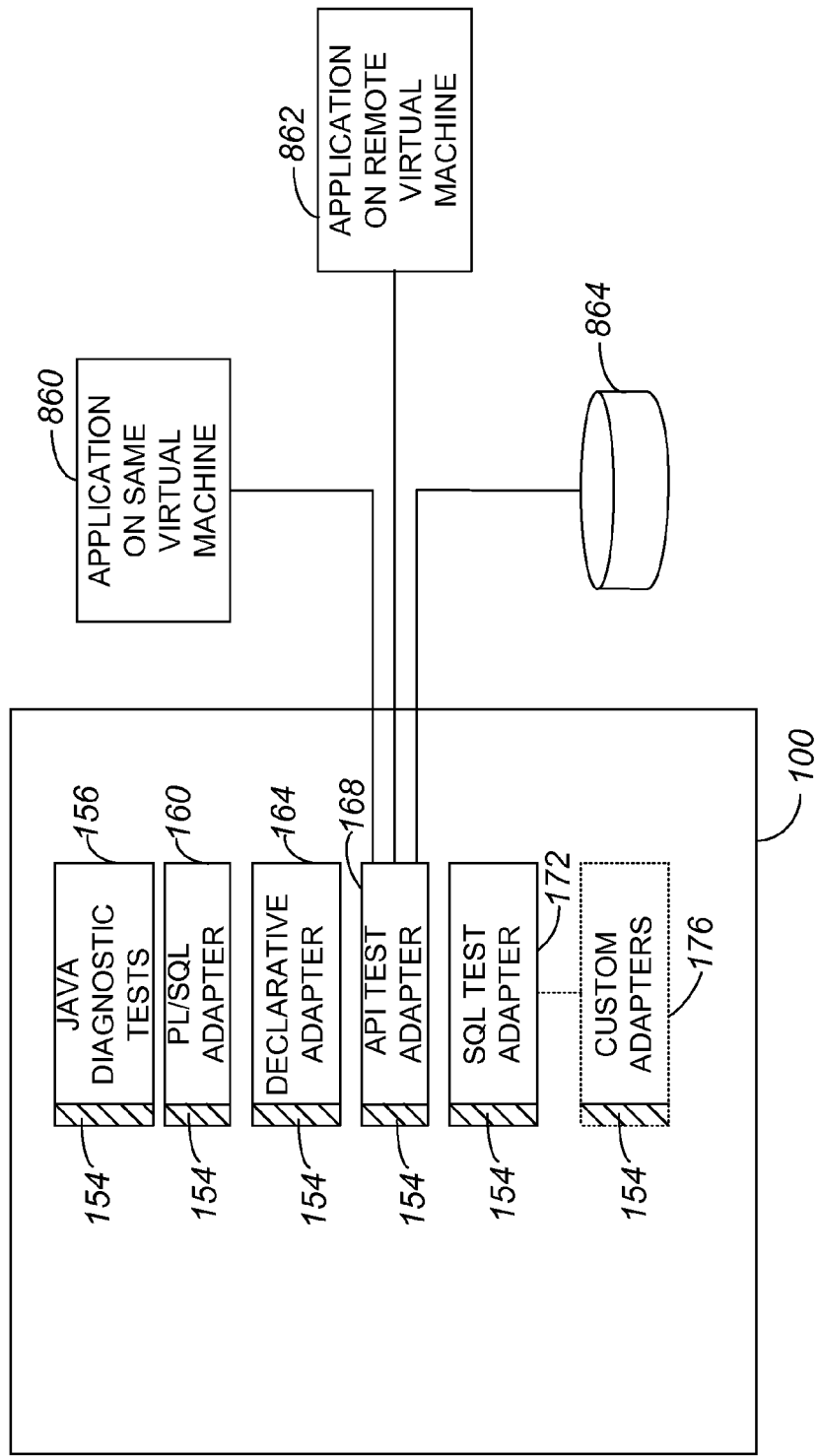
FIG. 6 is a diagrammatic representation of a system, e.g., system 100 of FIG. 1, interfaced with remote applications and a remote database in accordance with an embodiment of the present invention.

Some API tests which are specified within XML schema definitions or, more generally, declarative metadata, such as XML schema definition 600 of FIG. 6 may be a part of a test suite. A test suite is generally an overall test application which includes a plurality of API tests. Referring next to FIG. 3, an XML tag structure which is used within an overall test application will be described in accordance with an embodiment of the present invention. An XML tag structure for a test application 700 includes a test suite tag 702 which may identify a name of the test suite, and provide some information pertaining to the test suite. Test suite 702 generally contains a plurality of tests that test a particular piece of functionality. Since a test suite typically includes a group of tests, e.g., a logical group of tests, test type tags such as test type tag 706 are effectively a component of test suite 702. As shown, test type tag 706 may be an API test type tag. An API test type tag is converted by a QA test interface object by an API test type adapter. In general, a QA test interface object is used by an execution layer for running the test specified by the API test type tag.

It should be appreciated that a test suite may generally contain a plurality of test type tags 706 which may include test type tags other than an API test type tag. Another suitable test type tag is a SQL test type tag, which will be described below with reference to FIG. 5. Different test types may generally exist within a test suite.

In one embodiment, a test application represents an overall product that is being tested, and may include one or more test suites. Substantially all test suites or, more generally, tests specified in a test application are pertinent to the overall product that is being tested. While any number of attributes may be specified with a test application, a test application is typically specified with at least a short name for the test application, a full name for the test application, and a file version of the test application.

A service bean information tag 710, which may be specified under API test type tag 706, is arranged to contain information relating to a service name and configuration information. Also specified under API test type tag 706 are an input parameters tag 714, an output parameters tag 722, a description tag 730, an error information tag 734, and an output exception tag 738. Input parameters tag 714 is arranged to encapsulate any number of input parameter tags 718. Similarly, output parameters tag 722 is arranged to encapsulate any number of output parameter tags 726.

FIG. 4 is a representation of one test application in accordance with an embodiment of the present invention. A test application 800 may be specified with a name and an identifier that uniquely identifies test application 800. A test suite 802, which may be considered to be a first level of hierarchy within test application 800, includes a component identifier which indicates a group of tests being run within test application 800. Included in test suite 802 are any number of test types 806a-d which, in the embodiment as shown, are API test types which are specified with a language, an identifier, a method name, and a class. As previously mentioned, while test types 806a-d are shown as all being API test types, test types 806a-d may include substantially any suitable test type, e.g., a SQL test type.

Each test type 806a-d, e.g., test type 806c which is an API test type, is specified with additional information. The additional information typically includes input parameters 814, where each input parameter 818 is specified within input parameters 814. Similarly, the additional information specified in test types such as test type 806c also includes output parameters 822, where each output parameter 826 is specified within output parameters 822. Error information 834 is also typically specified within test types with a type. An error message and error fix information are also included within error information 834. In the described embodiment, test type 806c further includes a description 830 which describes test type 806c.

As previously mentioned, a test suite may include test type tags other than, or in addition to, an API test type tag. By way of example, a test suite may include a SQL test type tag. A SQL test type and an API test type may have tags in common, as well as tags which are not in common. When an API test type adapter and a SQL test type adapter, e.g., API test type adapter 168 and SQL test type adapter 172 of FIG. 1, are created, each test type adapter includes generic tags. Further, an API test type adapter and a SQL test type adapter may each include custom tags. Specifically, each test type adapter effectively extends a generic adapter, e.g., generic adapter portion 154 of FIG. 1.

A system such as system 100 of FIG. 1 may generally be accessed remotely for purposes of running a remote test, e.g., running a remote API test, and of potentially debugging components associated with system 100. FIG. 5a illustrates a remote invocation of a test which executes within an API testing framework in accordance with an embodiment of the present invention. A first element 840, which may be a provider node or a server, may invoke a test 844 that is resident on a second element 842, which may be a customer node or a client that includes an API testing framework such as system 100 of FIG. 1. In one embodiment, a provider or first element 840 may run test 844 on second element 842 to diagnose any issues with test 844. Alternatively, when there is a problem with second element 842, a provider or first element 840 may identify test 844 as being a test that is suitable for identifying the problem and, hence, perform a remote call invocation to run test 844. In other words, the ability for first element 840 to perform a remote call invocation to run test 844 may generally enable first element 840 to either "see" how test 844 runs on second element 842, or to use test 844 to effectively diagnose a problem associated with the framework on second element 842.

Elements within a system such as system 100 of FIG. 1 may access remote applications or database in the course of running a test. By way of example, an API test adapter such as API test adapter 168 of FIG. 1 may include remote call invocation functionality that allows remote calls to be made when an API test is being executed. Generally, as shown in FIG. 5b, a virtual machine 850, e.g., a Java virtual machine, which is associated with an API testing framework, has a test 852 such as an API test to be executed. During the course of executing test 852, test 852 may access a remote application or a database 854 to obtain an application to execute or to obtain information stored in a database. As will be discussed below with respect to FIG. 6, functionality that enables remote application or database 854 to be accessed is imparted on adapters which interface with a test interface. Remote application or database 854 may generally be substantially any application or database which is not associated with virtual machine 850.

FIG. 6 is a diagrammatic representation of an API test adapter and remote elements which may be accessed by the API test adapter in accordance with an embodiment of the present invention. A framework or system 100, which is described in detail in FIG. 1, includes API test adapter 168 which includes functionality associated with generic adapter portion 154 and also extends the functionality of generic adapter portion 154. The ability to access remote elements is typically part of the functionality that is an extension of generic adapter portion 154. That is, the functionality which enables access to remote elements, while provided by API test adapter 168, is generally not included in generic adapter portion 154. It should be appreciated that substantially any adapter, e.g., custom adapters 176 or SQL test adapter 172, may include the ability to access remote elements.

When an API test is executing within system 100, and access to a remote application or a database is necessary, API test adapter 168 may access the appropriate remote application or remote database. A remote call may be needed when a test script being executed within system 100 either references a remote application 860, 862 or utilizes data stored in a remote database 864. In general, a remote method invocation or application call may be made to an application 860 which is on the same virtual machine as system 100, or to an application 860 that is on a remote virtual machine. In one embodiment, application 860 may be on a different computing system than system 100, and may be accessed by API test adapter through a network.

Figure 7:
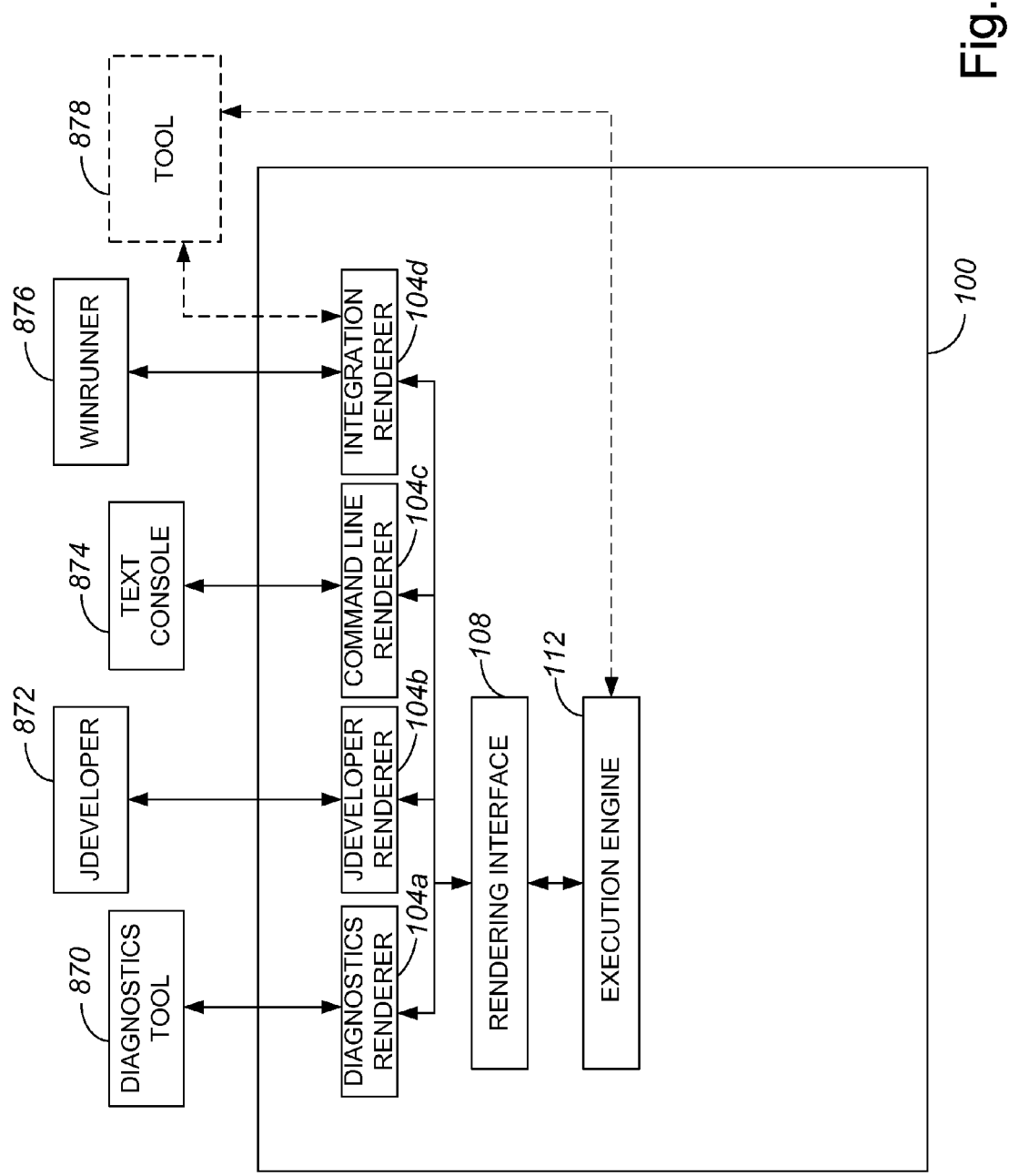
FIG. 7 is a diagrammatic representation of a system, e.g., system 100 of FIG. 1, interfaced with external tools in accordance with an embodiment of the present invention.

System 100 of FIG. 1 may generally be arranged to cooperate with external programs or applications such that the functionality of the external programs or applications may be used with the system. By way of example, programs or tools such as JDeveloper or Winrunner may be interfaced with system 100 of FIG. 1 through renderers 104. Renderers 104 generally serve to enable a rendering interface, e.g., rendering interface 108 of FIG. 1, to communicate with external tools. With reference to FIG. 7, the use of external tools with system 100 will be described in accordance with an embodiment of the present invention. Rendering interface 108 generally transform raw output data obtained from execution engine 112 into a format which may be understood by renderers 104. Renderers 104, in turn, are effectively adapters which extend the functionality of rendering interface 108 by transforming or marshalling data into a format that may be utilized by appropriate tools. By way of example, diagnostics renderer 104a may extend rendering interface 108 by providing functionality which enables data to be transformed into a format which may be understood by a diagnostics tool 870. It should be appreciated that diagnostics renderer 104a may also be arranged to transform data received from diagnostics tool 870 into a format which may be understood by rendering interface 108. Diagnostics tool 870 may be substantially any tool, as for example a user interface tool, which enables diagnostics associated with a test such as an API test to be effectively monitored and recorded.

JDeveloper renderer 104b is arranged to extend rendering interface 108 by providing functionality which enables data to be transformed into a format which may be understood by a JDeveloper tool 872, or to transform data provided by JDeveloper tool 872 into a format that may be understood by rendering interface 108. A JDeveloper tool 872 is generally an integrated development environment which provides support that enables Java applications and World Wide Web (WWW) services to be modeled, developed, debugged, optimized, and deployed. Among the developmental capabilities of the JDeveloper tool is an ability to enable integrated debugging, and an ability to both enable schemas such as XML schemas to be created and to be connected as application components.

A text console 874 is generally a tool which enables a log associated with the execution of a test such as an API test to be generated. Text console 874 may interface with system 100 through a command line renderer 104c. Integration renderer 104d is generally arranged to extend rendering interface 108 such that a variety of tools may be interfaced with system 100. Tools which may be interfaced through integration renderer 104d include Winrunner 876 and substantially any tool 878 that may allow information to be provided in a log. Winrunner 878 enables user keystrokes or interactions to be captured, verified, and replayed.

It should be appreciated that some tools 878, rather than being interfaced with system 100 through integration renderer 104d, may be interfaced directly to execution engine 112. By way of example, tools 878 with relatively simple functionality such as test which may be arranged to determine substantially only whether a test passes or fails may be interfaced directly with execution engine 112.

In general, renderer "layer" 104 provides an interface by which external tools such as diagnostics tool 870, JDeveloper 872, and Winrunner 876 may effectively be "plugged" into system 100, since renderer layer 104 provides the functionality needed to enable the external tools to communicate with rendering interface 108. Hence, renderer layer 104 serves to effectively provide a mechanism through which tools may be used with, e.g., interfaced with, system 100 to enhance the capabilities of system 100.

When an API test is effectively inputted by a user, as for example through a text console, in order for the substantially exact API test to be subsequently recreated, the API calls associated with the API test may be captured and recorded in a script or a file such that the API test may be subsequently accessed. Typically, an API call is intercepted by a recording tool which is interfaced with an execution engine that is involved in executing API tests. Once an API call is intercepted, a Java object, as for example a test information (testinfo) object, is created in memory to describe the API call.

Figure 8:
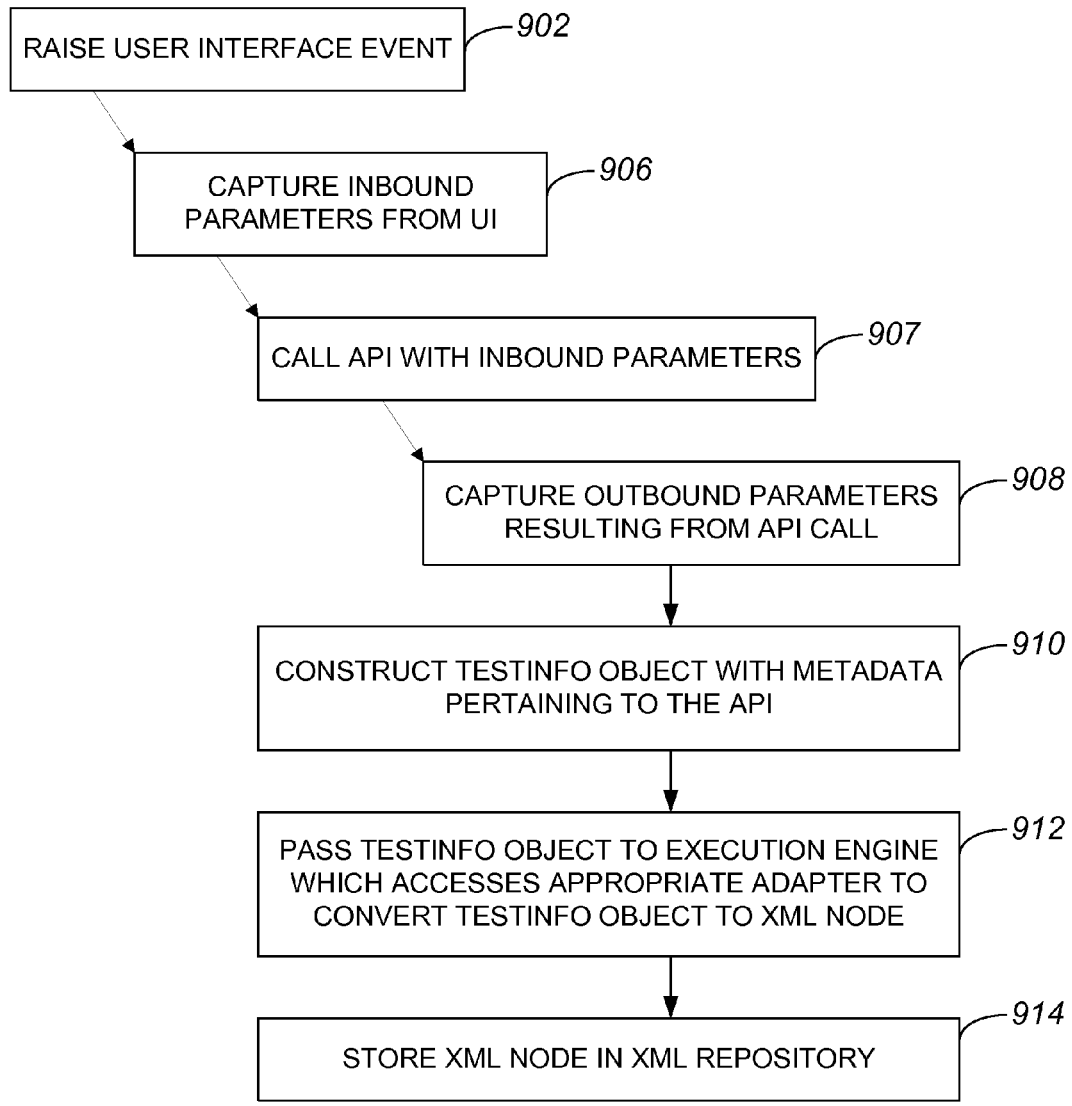

FIG. 8 is a block diagram representation of a process of recording an API test script in accordance with an embodiment of the present invention. A process of recording an API test scrip begins at step 902 in which a user interface event is raised. A user interface event may be, for example, the act of a user inputting commands associated with an API test into a text console, web page, or other tool which enables the user to access a testing system such as system 100 of FIG. 1. When a user interface event is raised, input or inbound parameters are captured from the user interface in step 906. Such inbound parameters are generally associated with an API, and are used in a call to an API in step 907. A user typically provides answers through a text console or web pages, and the answers are then provided as values to a virtual machine which massages the values to either directly or indirectly obtain inbound parameters. The virtual machine may generally be arranged to call the API. An API call includes inbound parameters, and may return output or outbound parameters. As discussed above with respect to FIG. 2, an API test may be specified with input parameters identified by an input parameters tag, and may result in output parameters specified by an output parameters tag. Such inbound and outbound parameters are captured by the recording tool. That is, inbound parameters are captured in step 906 and used to call an API in step 907, while outbound parameters are captured in step 908 effectively when the API call is completed. Capturing parameters associated with the API call essentially captures the API call.

Once the API call is captured, a testinfo object is constructed using metadata pertaining to the API in step 910. The testinfo object is then passed in step 912 to an execution engine, as for example execution engine 112 of FIG. 1. The execution engine causes an appropriate adapter to be accessed to convert the testinfo object into an XML node. Typically, the execution engine delegates a call to the appropriate adapter to create the XML node, and the appropriate adapter returns the XML node to the execution after the XML node is created. In one embodiment, each API call is associated with a testinfo object, and each testinfo object is used in the creation of a single XML node. It should be appreciated that a plurality of XML nodes may be saved as an XML tree in a file which effectively encompasses a test suite of API calls.

Upon the creation of the XML node, the XML node is stored as a file in a repository, e.g., a XML repository, in step 914. It should be appreciated that once the XML node is stored as a file, the XML node may be accessed as a test script substantially any time the API call associated with the XML node is to be executed.

A recording tool may be substantially any program or application which allows API calls, inbound or input parameters, and output or outbound parameters to be captured. Such a recording tool may effectively be a standalone program or application which may be substantially directly interfaced with an execution engine. Alternatively, such a recording tool may be a part of another program or application that is interfaced with an execution engine through an appropriate renderer and a rendering interface. By way of example, a recording tool may be part of a tool such as JDeveloper.

Figure 9:
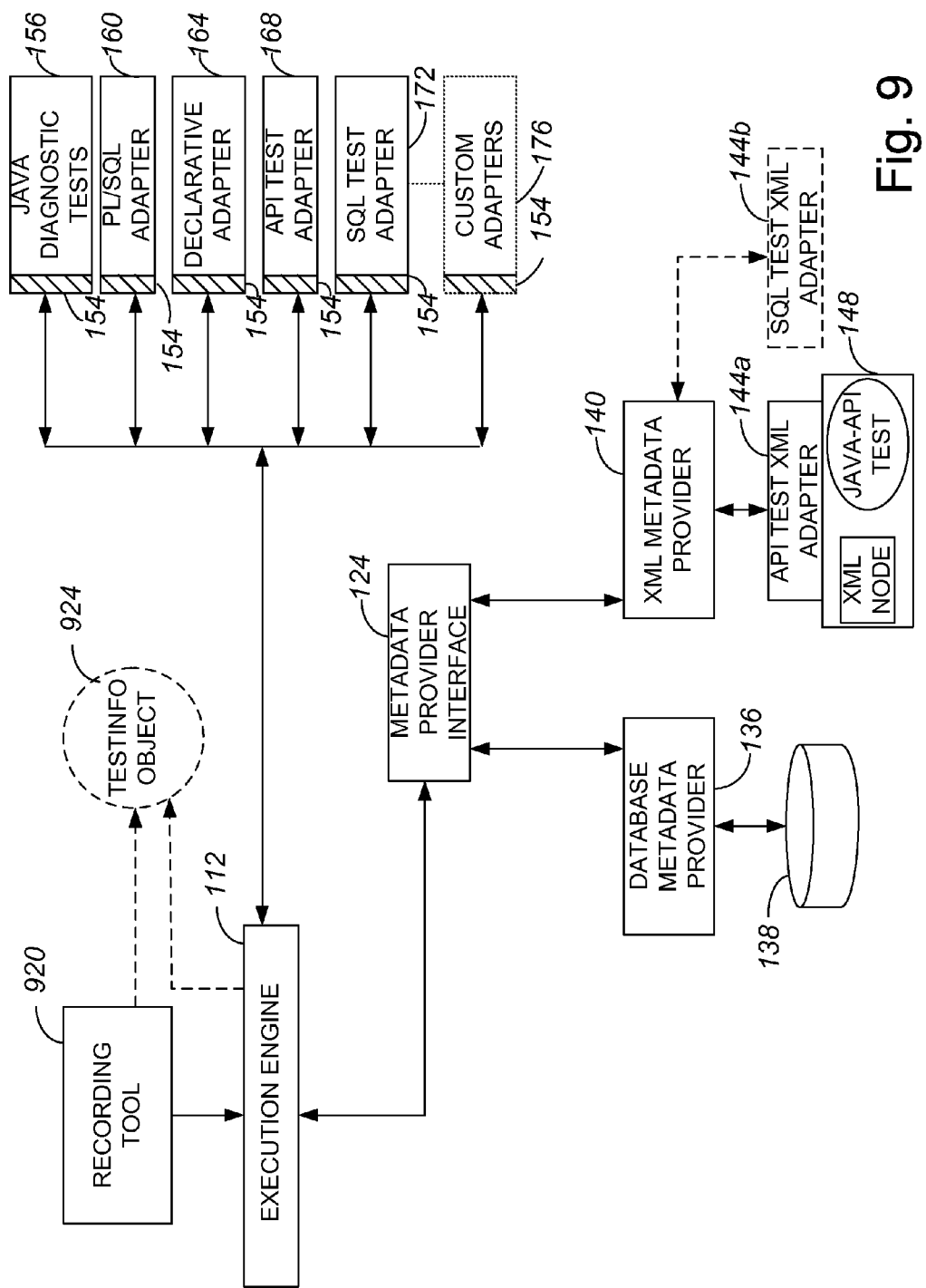

In general, a system such as system 100 of FIG. 1 is suitable for "playing back" recorded API calls that are stored in a repository. In addition to being used to effectively play back recorded API calls, some components of system 100 of FIG. 1 may also be used to record the API calls. FIG. 9 is a diagrammatic representation of a framework which is suitable for use in recording and storing a script associated with an API test in accordance with an embodiment of the present invention. A recording tool 920 generally interfaces either directly or indirectly with execution engine 112. Recording tool 920 is arranged to access execution engine 112 to capture an API call, as well as any inbound parameters associated with the API call and any outbound parameters associated with the API call.

Recording tool 920 causes a testinfo object 924 to be created, and passes testinfo object 924 to execution engine 112 which causes an appropriate adapter, as for example API test adapter 148, to be accessed to effectively convert testinfo object 924 into an XML node which may be stored in repository 148. API test adapter 148 generally includes the logic and the functionality needed to create an XML node which encapsulates an API call from testinfo object 924.

Generally, a recording tool such as recording tool 920 may record API test metadata for playback purposes, e.g., API playback in a sequential manner. In order for APIs to be played back in a sequential manner, APIs may share contextual data as they are being executed by a test tool. Hence, the recording tool, in addition to capturing API calls along with their associated inbound and outbound parameters, may mark some outbound parameters for pipelining to subsequent APIs. Pipelining, as discussed in copending U.S. patent application Ser. No. 10/991,883, filed Nov. 17, 2007, which is been incorporated by reference, allows parameters generated as output from one API test to be used as inbound parameters to other API tests. At the time an API is played back, the testing tool may pipeline the actual outbound data, in part or as a whole, using an expression language which is in a format that is understood by a test engine. The recording tool may embed expressions of the expression language within outbound parameters, and may embed expressions of the same expression language within inbound parameters to indicate to the playback tool, or the testing tool, that inbound parameters values for an API may be pipelined, e.g., may be obtained from a runtime data store.

Although only a few embodiments of the present invention have been described, it should be understood that the present invention may be embodied in many other specific forms without departing from the spirit or the scope of the present invention. By way of example, while Java has generally been described as an API test type language, substantially any test type language may be used. Suitable test type languages may include, but are not limited to, SQL and PL/SQL.

A system with an API test adapter has been described as also including a SQL test adapter and other custom test adapters. It should be appreciated that a system which includes an API test adapter may not necessarily also include a SQL test adapter or other custom test adapters. Conversely, a SQL test adapter or other custom adapters may be included in a system that does not include an API test adapter.

While declarative metadata has been described as being XML metadata, it should be appreciated that declarative metadata is not limited to being XML metadata. Other suitable types of declarative metadata may be used to create a schema that utilizes common and custom tags.

In general, the steps associated with methods of the present invention may vary widely. Steps may be added, removed, altered, and reordered without departing from the spirit or the scope of the present invention. Therefore, the present examples are to be considered as illustrative and not restrictive, and the invention is not to be limited to the details given herein, but may be modified within the scope of the appended claims.

What is claimed is:

1. A method comprising:
capturing a first call to an application programming interface (API) using a framework, the framework including an execution engine and an adapter, the execution engine being arranged to communicate with the adapter to cause the first API call to be executed, wherein the capturing the first call comprises:
making the first API call;
in a system, constructing an object using metadata associated with the first API call;
in the system, converting the object into a node, the node being of a declarative metadata format capable of being transformed into an object by the system;
storing the node in the system;
obtaining at least one outbound parameter, the at least one outbound parameter being arranged to result from the first API call; and
using the at least one outbound parameter as an inbound parameter to a second API call.

2. The method of claim 1 wherein making the first API call includes providing at least one inbound parameter for use in making the first API call.

3. The method of claim 2 further including:
raising an event which causes the at least one inbound parameter to be obtained.

4. The method of claim 1 wherein converting the object into the node includes passing the object to the execution engine, and wherein the execution engine accesses the adapter to convert the object into the node.

5. The method of claim 1 wherein storing the node includes storing the node in a repository, the repository being included in the framework.

6. The method of claim 1 wherein the declarative metadata format is an XML format, and the node is an XML node.

7. A system for capturing a call to an application programming interface (API), the system comprising:
a recording tool of a system, the recording tool being arranged to construct an object with metadata that is associated with the first API call, to discern data associated with a second API call which is to be used as an inbound parameter of the first API call;
an execution engine, wherein the recording tool is arranged to pass the object to the execution engine;
an adapter, wherein the execution engine is arranged to communicate with the adapter to cause the adapter to convert the object into a node, the node being of a declarative metadata format capable of being transformed into an object; and
a repository, the repository being arranged to store the node, wherein the repository and the adapter reside in the system.

8. The system of claim 7 wherein the adapter is further arranged to cause the first API call to execute.

9. The system of claim 7 wherein the recording tool is arranged to substantially directly interface with the execution engine.

10. The system of claim 7 wherein the declarative metadata format is an XML format and the node is an XML node.

11. The system of claim 7 wherein the recording tool is arranged to discern when an outbound parameter of the first API call is to be used as an inbound parameter for a third API call.

12. A system for capturing a call to an application programming interface (API), the system comprising:
   means for making the first API call;
   means for constructing an object using metadata associated with the first API call;
   means for converting the object into a node in a framework, the node being of a declarative metadata format capable of being transformed into an object by the framework;
   means for storing the node;
   means for accessing the node to access the first API call; and
   means for obtaining at least one outbound parameter, the at least one outbound parameter being arranged to result from the first API call.

13. The system of claim 12 wherein the means for making the first API call include means for providing at least one inbound parameter for use in making the first API call.

14. The system of claim 13 wherein the at least one inbound parameter is an outbound parameter associated with a previous API call.

15. The system of claim 13 further including:
   means for raising an event which causes the at least one inbound parameter to be obtained.

16. The system of claim 12 wherein the means for converting the object into the node include means for passing the object to the execution engine, and wherein the execution engine accesses the adapter to convert the object into the node.

17. The system of claim 12 wherein the declarative metadata format is an XML format, and the node is an XML node.

18. A framework suitable for use to test an application programming interface (API), the framework comprising:
   a metadata provider arrangement, the metadata provider arrangement being arranged to store declarative metadata;
   a metadata provider interface arranged to obtain the declarative metadata associated with a first test for the application programming interface from the declarative metadata provider;
   a first test adapter, the first test adapter being arranged to include logic used to convert the declarative metadata into an object, the first test adapter further being arranged to access remote information;
   a test interface, the test interface being arranged to cooperate with the first test adapter to construct the first test for the application programming interface, wherein the first test adapter is effectively interfaced with the test interface;
   an execution engine, the execution engine being arranged to communicate with the test interface to cause the first test to be executed on the application programming interface, wherein the first test on the application programming interface produces test results that are compared against expected test results; and
   a specification of a pipelined datum, the pipelined datum being arranged to be accessed by the first test as well as a second test, wherein the pipelined datum is one of an input to be read by the second test from an in-memory data structure and an output to be written by the first test into the in-memory data structure.

19. The framework of claim 18 wherein the remote information is an application associated with a first virtual machine, the first virtual machine being associated with the framework.

20. The framework of claim 18 wherein the remote information is an application associated with a different virtual machine than a virtual machine associated with the framework.

21. The framework of claim 18 wherein the remote information is a remote database that is not part of the framework.

22. A method for running an application programming interface (API) test comprising:
   determining an appropriate test adapter of a plurality of test adapters to use to obtain test data, the plurality of test adapters comprising an API test adapter, an SQL test adapter, and a declarative test adapter, each having a generic test adapter portion that defines at least one tag that is common to the plurality of test adapters and a custom test adapter portion that defines at least one tag that is not common to the plurality of test adapters,
   wherein the API test adapter enables at least one custom tag associated with an API test to be read and written, the SQL test adapter enables at least one custom tag associated with a SQL test to be read and written, and the declarative test adapter enables at least one custom tag associated with a declarative metadata test to be read and written;
   obtaining test data using the appropriate test adapter, the test data including declarative metadata capable of being transformed into an object;
   providing the test data to a test interface;
   executing a test associated with the test data on the application program interface using the test interface, wherein executing the test associated with the test data using the test interface comprises calling the appropriate test adapter to obtain testing logic for executing the test associated with the test data, the appropriate test adapter being in communication with the test interface, and the appropriate test adapter further being arranged to access at least one of an application and a database; and
   with a test application, executing the test on a first entity using the appropriate test adapter, wherein the test application is further arranged to specify at least a second entity to be tested and executing the test application causes a first output associated with testing the first entity to be stored in an in-memory data structure and causes the first output associated with testing the first entity to be obtained from the in-memory data structure as a first input associated with testing the second entity.

23. The method of claim 22 wherein the application is an application that is arranged to execute on a virtual machine that is common to the appropriate test adapter and the application.

24. The method of claim 22 wherein the application is an application that is arranged to execute on a different virtual machine than a virtual machine that is associated with the appropriate test adapter.

25. A system suitable for use to test an application programming interface (API), the system comprising:
   a framework arranged to perform a first API test by causing a test script associated with the first API test to be executed, the framework including a test interface and an execution engine, the execution engine being arranged to communicate with the test interface to cause the first API test to be executed, the test script including declarative metadata capable of being transformed into an object within the framework, the framework further including a rendering interface in communication with the execution engine and at least one renderer in communication with the rendering interface, the rendering interface being arranged to facilitate a transformation of information associated with the first API test, the at least one renderer being arranged to implement the rendering interface;

an application, the application being arranged to communicate with the rendering interface through the at least one renderer; and a specification of a pipelined datum, the pipelined datum being arranged to be accessed by the first API test as well as a second API test, wherein the pipelined datum is one of an input to be read by the second API test from an in-memory data structure and an output to be written by the first API test into the in-memory data structure.

26. The system of claim 25 wherein the application is one of a diagnostics application, an application arranged to record the test script, JDeveloper, and WinRunner.

27. The system of claim 26 wherein the at least one renderer arranged to implement the rendering interface includes a diagnostics renderer, the diagnostics renderer being arranged as an interface between the application and the rendering interface.

28. The system of claim 25 wherein the rendering interface is arranged to transform data obtained from the execution engine into a first format which is understood by the first renderer, and the at least one renderer is arranged to transform the data from the first format which is understood by the first renderer into a second format which is understood by the application.

29. A method for interfacing an application with a framework, the framework being arranged to execute a first API call, the framework including an execution engine and at least one adapter, the execution engine being arranged to cause the at least one adapter to execute the first API call, the method comprising:

integrating the application with a rendering arrangement, the rendering arrangement being arranged to enable the application to communicate with the execution engine; and executing the first API call, wherein the first API call is specified a declarative metadata format capable of being transformed into an object within the framework and the first API call executes while the application communicates with the execution engine; and executing a second API call, wherein the executing the second API call causes a first output associated with the first API call to be stored in an in-memory data structure and causes the first output associated with the first API call to be obtained from the in-memory data structure as a first input associated with the second API call.

30. The method of claim 29 wherein the rendering arrangement includes a rendering interface and a first renderer, the rendering interface being arranged to transform data obtained from the execution engine into a first format which is understood by the first renderer, the first renderer being arranged to transform the data from the first format which is understood by the first renderer into a second format which is understood by the application.

31. The method of claim 30 wherein the rendering arrangement further includes a second renderer, the second renderer being arranged to transform the data from the first format into a third format.

32. The method of claim 29 wherein the declarative metadata is XML.

33. A framework with which an application is interfaced, the framework being arranged to execute a first API call the framework comprising:

means for integrating the application with the framework to enable the application to communicate with the execution engine; and means for executing the first API call, wherein the first API call is specified a declarative metadata format capable of being transformed into an object within the framework and the first API call executes while the application communicates with the execution engine; and means for executing a second API call, wherein the executing the second API call causes a first output associated with the first API call to be stored in an in-memory data structure and causes the first output associated with the first API call to be obtained from the in-memory data structure as a first input associated with the second API call.

34. The framework of claim 33 wherein the means for integrating the application with the framework include means for transform data obtained from the execution engine into a format which is understood by the application.

35. A method for recording a first API test comprising:

embedding a first expression in an inbound parameter of a call associated with the first API test, the first expression being arranged to indicate that the inbound parameter of the call is to be obtained from a second API test, the inbound parameter of the call being an outbound parameter of the second API test, wherein the call is specified a declarative metadata format capable of being transformed into an object;

recording the inbound parameter of the call;

embedding a second expression in an outbound parameter of the call associated with the first API test, the second expression being arranged to indicate that the outbound parameter of the call is to be an input parameter to a subsequent API test; and recording the outbound parameter of the call.

* * * * *